United States Patent [19]

Toda et al.

[11] Patent Number: 4,623,393
[45] Date of Patent: Nov. 18, 1986

[54] REFRACTORY GUN MIX

[75] Inventors: Masumi Toda, Oku County; Masashi Mori, Okayama; Shingo Nonaka, Akaiwa County; Hiroshi Kyoden, Okayama; Kenji Ichikawa, Bizen; Yoshihisa Hamazaki, Okayama, all of Japan

[73] Assignee: Shinagawa Refractories Co., Ltd., Tokyo, Japan

[21] Appl. No.: 661,333

[22] Filed: Oct. 16, 1984

[30] Foreign Application Priority Data

Oct. 17, 1983 [JP] Japan ................. 58-192572

[51] Int. Cl.$^4$ .............................. B28B 7/36
[52] U.S. Cl. .................. 106/38.22; 106/38.27; 106/38.28; 106/104; 252/62
[58] Field of Search ............... 106/38.22, 38.27, 38.28, 106/104; 252/62

[56] References Cited

U.S. PATENT DOCUMENTS 3,802,894  4/1974  Prost et al. ................... 106/104

FOREIGN PATENT DOCUMENTS 55-15948  2/1980  Japan.

OTHER PUBLICATIONS

Slurry Adding Type Gunning Method of Castable Refractories by Yoichi Naruse et al.

Primary Examiner—Lorenzo B. Hayes
Attorney, Agent, or Firm—Wenderoth, Lind & Ponack

[57] ABSTRACT

A low cement refractory gun mix is disclosed. The gun mix comprises a coarse refractory portion having a particle diameter of at least 74 microns and a fine powder portion having a particle diameter of at most 74 microns. The gun mix is prepared by forming the fine powder portion into a slurry and deflocculating it prior to mixing it with the coarse refractory portion rather than deflocculating it when it is introduced into a spray gun. The gun mix has an extremely low cement and water content. Accordingly, a sprayed deposit of high packing density can be obtained which is equal in quality with deposits produced by vibration molding or casting. The gun mix is appropriate for use in forming the entire work lining of containers for molten metal.

12 Claims, No Drawings

REFRACTORY GUN MIX

BACKGROUND OF THE INVENTION

The present invention relates to the composition of a refractory gun mix for use in lining ladles, tundishes, spouts, and similar equipment for use in the movement or treatment of high temperature molten metals such as molten iron or molten steel.

Various methods have been used in the past for applying a lining of agalmatolite, zircon, alumina, or other type of refractory material to such vessels for molten metal. These methods include the use of bricks, vibration molding, casting, slinging, and stamping. Among these methods, vibration molding and casting are the most commonly used due to their efficiency, speed, and economy. However, the latter two methods have the drawbacks that they involve mixing an unshaped refractory at the site of application, building a frame for molding, and other complexities.

Whereas application of an unshaped refractory by spraying does not have these drawbacks, up to the present time, it has not been possible to extensively use spray application to form the work lining of vessels for molten metal.

When using vibration molding or casting to apply an unshaped refractory to a vessel such as a ladle, a low cement castable refractory (one containing as little alumina cement as possible) is used. This is because alumina cement has the undesirable properties that it ruptures upon quick drying and that dehydration of hydrated alumina cement causes decreased strength, decreased resistance to slag, and other forms of deterioration in an intermediate temperature range (800°–1000° C.).

However, when an unshaped refractory is applied by spraying with a spray gun, even in dry-type spraying in which the refractory is sent under pressure to the nozzle of a spray gun where it is sprayed as it is mixed with water, the water content of conventional sprays is high (15–20%), and the resulting sprayed deposit has an undesirably low packing density, leading to a reduced service life. The quality of the deposit is therefore inferior to that of a deposit applied by vibration molding or casting.

Thus, up to the present time, gun mixes have not been used to form the entire work lining of vessels for molten metal. Conventional spraying materials such as magnesia-type or zircon-type gun mixes have been used in the hot or cold state merely for repairing local damage in vessels originally lined by vibration molding or casting.

Thus, there is a need for a low cement castable refractory material which can be applied by spraying and which produces a deposit equal in quality to deposits applied by vibration molding or casting so that spraying can be used not only for the repair of locally damaged areas but for forming the entire work lining of the above-mentioned containers for molten metals.

Various methods have been studied of reducing the water content of gun mixes at the time of application, such as using various particle sizes and various types of binders in the gun mix. However, no satisfactory method has yet been found. For example, the mere addition of a deflocculant to deflocculate a fine powder portion having a particle diameter of at most 74 microns is ineffective, since a deflocculant requires approximately 3–5 seconds to deflocculate, whereas in dry-type spraying, less than 1 second elapses between the time the refractory powder is mixed with water in the nozzle of a spray gun and the time when the spray contacts the surface on which it is to be applied. Accordingly, there is insufficient time for the deflocculant to be effective.

SUMMARY OF THE INVENTION

It is the object of the present invention to provide a refractory gun mix with a low cement content which forms a deposit which has a high packing density and a quality equal to deposits applied by vibration molding or casting, and which can thus be used for forming the entire work lining of containers for molten metal.

The present invention is a gun mix prepared by adding a hardening accelerator to a coarse refractory portion having a particle diameter of at least 74 microns, adding a deflocculant to a fine powder portion having a particle diameter of at most 74 microns, separately mixing the coarse refractory portion and the fine powder portion, and using a liquid binder to form the fine powder portion into a slurry. In a preferred embodiment, the fine powder portion comprises a fine powder and an ultrafine powder, the ultrafine powder having a particle size of at most 10 microns and preferably at most 1 micron. The fine powder and the coarse refractory portion comprise approximately -97% of the combined weight of the coarse refractory portion and the fine powder portion and comprise at least one material selected from a silaceous raw material, a high alumina raw material, and a zircon refractory raw material. The silaceous raw material is selected from silica sand, silica, and agalmatolite, the high alumina raw material is selected from electrofused alumina, calcined alumina, bauxite, and Chinese bauxite, and the zircon refractory raw material is selected from zirconia and zircon.

By regulating the particle size of the fine powder portion and by defloculating it prior to application in the above manner, the water content of the gun mix at the time of application and the amount of alumina cement contained in the gun mix can be made extremely small, and a sprayed material having excellent characteristics, in particular a high packing density, can be obtained.

Japanese Laid Open Patent Application No. 55-15948 discloses a spray method using a basic gun mix in which a binder solution is used instead of water. Also, in the April, 1981 issue of "Refractory" published by the Refractory Technology Association (in Japanese), an article entitled "Spray Application Method by Addition of a Castable Slurry" describes an aggregate which is made into a semiwet state and a binder which is formed into a slurry by the addition of water.

However, the technical concept of the gun mixes of the above publications are essentially different from that of the present invention in that a low alumina castable refractory is used in the gun mix and in that a fine powder portion having a particle size of at most 74 microns is made into a slurry with a liquid binder.

DESCRIPTION OF THE PREFERRED EMBODIMENT

A refractory gun mix according to the present invention is one prepared by adding a hardening accelerator to a coarse refractory portion having a particle diameter of at least 74 microns, adding a deflocculant to a fine powder portion having a particle diameter of at most 74 tion and the fine powder portion, and using a liquid binder to form the fine powder portion into a slurry.

The present inventors found as a result of numerous experiments that if the minimum particle size of the coarse refractory portion and the maximum particle size of the fine powder portion are 74 microns, the fine powder portion can be most easily deflocculated, and the viscosity of the slurry formed when the fine powder portion is mixed with a liquid binder enable the use of the optimal line pressure and nozzle diameter for the spray gun employed to apply the gun mix.

The coarse refractory portion comprises one or more materials chosen from the group consisting of (1) a siliceous raw material such as silica sand, silica, or agalmatolite, (2) a high alumina raw material such as electrofused alumina, calcined alumina, bauxite, or Chinese bauxite, and (3) a commonly used zircon refractory raw material such as zirconia or zircon. The above material or materials is sieved to obtain particles with a particle diameter of at least 74 microns which are used in the coarse refractory portion. The remaining particles having a particles diameter of at most 74 microns are saved to be used in the fine powder portion to be described below.

To promote the hardening of the coarse refractory portion at the time of application, a hardening accelerator is previously mixed with the coarse refractory portion. As the hardening accelerator, one or more materials such as a sulfate, a nitrate, $Na_2CO_3$, $K_2CO_3$, $Na_2O \cdot SiO_2$, $K_2O \cdot SiO_2$, a lithium salt, $Ca(OH)_2$, or other hardening accelerator can be used. When the hardening accelerator is mixed with the coarse refractory portion, although it is not always necessary, it may be desirable to add a small amount of water so as to achieve a moist state which prevents the formation of dust. The amount of hardening accelerator used depends upon the thickness of application and also on the season; in winter, a somewhat larger amount of hardening accelerator is appropriate, and in summer a somewhat smaller amount. The weight of hardening accelerator added should be equal to approximately 0.005-0.5% by weight of the combined weight of the coarse refractory portion and the fine powder portion. It is not necessary to remix the coarse refractory portion at the time of application.

The fine powder portion having a grain size of at most 74 microns comprises a fine powder and an ultrafine refractory powder. The fine powder is that part of the above-described sieved raw materials used for the coarse refractory portion having a particle size of at most 74 microns. The ultrafine refractory powder should have a particle diameter of at most 10 microns and preferably of at most 1 micron. As the ultrafine powder, one or more materials selected from clay, kaolin, silica flour resulting as a by-product during the manufacture of ferrosilicon or metasilicon, hydrous silicic acid, carbon black, silica produced by a vapor phase process, alumina, titanium oxide, or calcined alumina can be used. If the particle diameter of the ultrafine refractory powder is greater than approximately 10 microns, the water reduction effect is small when a deflocculant is added to the fine powder portion. If the particle diameter of the ultrafine powder is 1 micron or less, the water reduction effect is particularly good. The ultrafine powder should constitute approximately 3-16% by weight of the combined weight of the coarse refractory portion and the fine powder portion. If it constitutes less than approximately 3% by weight, a sufficient water reduction effect can not be achieved, and if it constitutes greater than 16% by weight, the shrinkage after heating is undesirably large. Accordingly, the coarse refractory portion and the fine powder of the fine powder portion together comprise approximately 84-97% by weight of the combined weight of the coarse refractory portion and the fine powder portion.

To the fine powder portion, 0.01-0.5% by weight of a deflocculant is added and mixed therewith. As the deflocculant, one or more deflocculants such as a formalin adduct of naphthalenesulfonic acid, lignosulfonate, or sodium phosphate can be used. If less than 0.01% by weight of deflocculant is used, an adequate dispersing effect is not achieved, and if more than 0.5% by weight is added, the optimally dispersed state can not be achieved.

After the deflocculant is added, the fine powder portion is mixed at the site where application is to take place with a liquid binder comprising a colloidal silica solution and/or one or more types of commonly marketed alumina cement such as Alcoa CA-25, Denka High Aluminous Cement Super, Secar 250, or JIS Type 1 or 2. The combined weight of the colloidal silica solution and the alumina cement is equal to approximately 0.3-8% by weight of the combined weight of the coarse refractory portion and the fine powder portion. The fine powder portion is mixed with the liquid binder and a small amount of water, if necessary, so as to obtain a slurry with a viscosity of at most 1500 cP and to deflocculate the fine powder portion.

The gun mix obtained in the manner described above can then be sprayed using a spray apparatus comprising a conventional batch-type or continuous-type gun, a slurry tank which is equipped with a stirring apparatus to prevent sedimentation of the slurry and which is capable of spraying at an air pressure of 3-7 kg/cm$^2$, and a nozzle portion in which the slurry is mixed with the coarse refractory portion. Using this gun mix, an adhesion rate and material packing density can be obtained which are the same or better than obtained by vibration molding or casting.

The present invention will now be explained in greater detail by the following examples of gun mixes according to the present invention. In the examples, amounts of raw materials are expressed as percent by weight of the entire weight of the gun mix.

EXAMPLE 1

A coarse refractory portion (particle diameter: at least 74 microns) was prepared by mixing 22% by weight of silica (1-3 mm in diameter) and 53% by weight of zircon sand. 0.3% by weight of a hardening accelerator comprising anhydrous sodium silicate was then mixed into the coarse refractory portion.

A fine powder portion (particle diameter at most 74 microns) was prepared separately from the coarse refractory portion by mixing 21% by weight of zircon flour (fine powder) and 4% by weight of silica flour (ultrafine powder). 0.1% by weight of a deflocculant comprising sodium tetraphosphate was then mixed with the fine powder portion. Prior to spraying, 5% by weight of a colloidal silica solution and 1% by weight of water were added to the fine powder portion to obtain a slurry and deflocculation was carried out. The gun mix thus prepared was then applied using a continuous-type spray gun. The coarse refractory portion and the slurry (slurry line pressure: 6 kg/cm$^2$) were mixed in the nozzle of the gun while being sprayed onto an agalmatolite brick surface at ordinary temperatures at a line pressure of 3 kg/cm² and a discharge rate of 70 kg/minute. For the purpose of comparison, the same gun mix was also applied to another agalmatolite brick surface by casting. The composition of the gun mix as well as the characteristics of the resulting materials after heating are shown in Table 1. As is apparent from the table, the same quality obtained by casting was obtained by spraying this gun mix.

TABLE 1

| COMPONENT | % BY WEIGHT | |
|---|---|---|
| COMPOSITION | | |
| silica 1-3 mm | 22 | |
| zircon sand | 53 | |
| anhydrous sodium silicate | 0.3 | |
| zircon flour | 21 | |
| silica flour | 4 | |
| sodium tetraphosphate | 0.1 | |
| colloidal silica solution | 5 | |
| water | 1 | |
| CHARACTERISTICS | | |
| | spraying | casting |
| After heating at 110° C. for 24 hours | | |
| permanent linear change (%) | 0 | −0.03 |
| apparent porosity (%) | 19.6 | 19.5 |
| bending strength (kg/cm²) | 64 | 34 |
| After heating at 1000° C. for 3 hours | | |
| permanent linear change (%) | +0.75 | +0.38 |
| apparent porosity (%) | 21.6 | 22.8 |
| bending strength (kg/cm²) | 20 | 10 |

EXAMPLE 2

A coarse refractory portion (particle diameter: at least 74 microns) was prepared by mixing 60% by weight of bauxite (0.3-6 mm), 11% by weight of electrofused alumina (at most 0.3 mm) and 6% by weight of silica (at most 1.4 mm). 0.05% by weight of a hardening accelerator comprising calcium hydroxide was then mixed in the coarse refractory portion.

A fine powder portion (particle diameter: at most 74 microns) was prepared separately from the coarse refractory portion by mixing 14% by weight of electrofused alumina (at most 74 microns), 5% by weight of calcined alumina (at most 74 microns), and an ultrafine powder comprising 1% by weight of silica flour and 3% by weight of clay. 0.05% by weight of a deflocculating agent comprising sodium phosphate (pH 5.5) was then mixed into the fine powder portion. Prior to spraying, 6% by weight of water and 2% by weight of high alumina cement were added to the fine powder portion to obtain a slurry and deflocculation was carried out.

The gun mix thus prepared was then applied to agalmatolite brick surfaces by spraying and by casting in the same manner as for Example 1. The composition of the gun mix and the characteristics of the applied coatings after heating are shown in Table 2. As is apparent from the table, the sprayed material using the gun mix according to the present invention had a better packing density than the material applied by casting, and the sprayed material had a high quality.

TABLE 2

| COMPONENT | % BY WEIGHT | |
|---|---|---|
| COMPOSITION | | |
| bauxite (0.3-6 mm) | 60 | |
| electrofused alumina (≦0.3 mm) | 11 | |
| silica (≦1.4 mm) | 6 | |
| calcium hydroxide | 0.05 | |
| electrofused alumina (≦74 microns) | 14 | |

TABLE 2-continued

| | | |
|---|---|---|
| calcined alumina (≦74 microns) | 5 | |
| silica flour | 1 | |
| clay | 3 | |
| high alumina cement | 2 | |
| sodium phosphate (pH 5.5) | 0.05 | |
| water | 6 | |
| CHARACTERISTICS | | |
| | spraying | casting |
| After heating at 110° C. for 24 hours | | |
| apparent porosity (%) | 17.2 | 19.5 |
| bulk specific gravity | 2.90 | 2.86 |
| bending strength (kg/cm²) | 50 | 40 |
| After heating at 1000° C. for 3 hours | | |
| apparent porosity (%) | 19.5 | 22.5 |
| bulk specific gravity | 2.87 | 2.80 |
| bending strength (kg/cm²) | 55 | 50 |

EXAMPLE 3

A coarse refractory portion (particle diameter: at least 74 microns) was prepared by mixing 55% by weight of bauxite (at most 2.38 mm), 14% by weight of electrofused alumina (at most 0.3 mm), and 5% by weight of silica (at most 1.0 mm). 0.3% by weight of a hardening accelerator comprising anhydrous sodium silicate was then mixed with the coarse refractory portion.

A fine powder portion (particle diameter: at most 74 microns) was prepared separately from the coarse refractory portion by mixing 10% by weight of electrofused alumina (at most 74 microns), 8% by weight of bauxite (at most 74 microns), 5% by weight of calcined alumina (at most 74 microns), and an ultrafine powder comprising 3% by weight of silica flour. 0.3% by weight of a deflocculant comprising lignosulfonic acid was then mixed with the fine powder portion. Prior to spraying, 5% by weight of a liquid binder comprising a colloidal silica solution and 1% by weight of water were mixed with the fine powder portion to obtain a slurry and deflocculation was carried out.

The gun mix thus prepared was then applied to agalmatolite brick surfaces by spraying and by casting in the same manner as for Example 1. The composition of the gun mix and the characteristics of the resulting deposit after heating are shown in Table 3. As can be seen from the table, the sprayed material had an increased packing density and a higher quality than the cast material.

TABLE 3

| COMPONENT | % BY WEIGHT | |
|---|---|---|
| COMPOSITION | | |
| bauxite (≦2.38 mm) | 55 | |
| electrofused alumina (≦0.3 mm) | 14 | |
| silica (≦1.0 mm) | 5 | |
| anhydrous sodium silicate | 0.3 | |
| electrofused alumina (≦74 microns) | 10 | |
| bauxite (≦74 microns) | 8 | |
| calcined alumina (≦74 microns) | 5 | |
| silica flour | 3 | |
| colloidal silica solution | 5 | |
| lignosulfonic acid | 0.3 | |
| water | 1 | |
| CHARACTERISTICS | | |
| | spraying | casting |
| After heating at 110° C. for 24 hours | | |
| apparent porosity (%) | 17.5 | 19.5 |
| bulk specific gravity | 2.90 | 2.86 |
| bending strength (kg/cm²) | 50 | 40 |
| After heating at 1000° C. for 3 hours | | |
| permanent linear change (%) | −0.10 | −0.12 |
| apparent porosity (%) | 19.5 | 22.5 |

TABLE 3-continued

| COMPONENT | % BY WEIGHT | |
|---|---|---|
| bulk specific gravity | 2.87 | 2.80 |
| bending strength (kg/cm²) | 60 | 55 |

As is clear from the above examples, the gun mix according to the present invention overcomes the drawbacks of previously existing gun mixes. Since it has a very low water content and contains only very little or no alumina cement, a high quality sprayed material of high packing density can be produced which is appropriate for forming the entire work lining of vessels for molten metal.

Since spray application is less complex than vibration molding or casting, the gun mix according to the present invention allows a decrease in the installation cost of the work lining of a vessel for molten metal.

What is claimed is:

1. A refractory gun mix prepared by:
  (A) Adding a hardening accelerator to a coarse refractory portion having a particle diameter size of at least 74 microns and mixing the hardening accelerator with the refractory portion;
  (B) Separately adding a deflocculant to a fine powder portion having a particle diameter size of at most 74 microns to form a fine powder mixture, and then adding a binder and water to said fine powder-deflocculant mixture and mixing it to form a slurry; and
  (C) mixing said coarse refractory portion (A) and said slurry (B) at the nozzle portion of a gun for gunning.

2. A refractory gun mix as claimed in claim 1, wherein said fine powder portion comprises a fine powder having a particle diameter of at most 74 microns and an ultrafine powder having a particle diameter of at most 10 microns and wherein the weight of said ultrafine powder is about 3–16% by weight of the combined weight of said coarse refractory portion and said fine powder portion.

3. A refractory gun mix as claimed in claim 2, wherein:
  said ultrafine powder comprises at least one material selected from the group consisting of clay, silica, hydrous silicic acid, carbon black, alumina, titanium oxide, and calcined alumina.

4. A refractory gun mix as claimed in claim 2, wherein said coarse refractory portion and said fine powder of said fine powder portion comprise at least one material selected from the group consisting of siliceous raw material, a high alumina raw material, and a zircon refractory raw material.

5. A refractory gun mix as claimed in claim 4, wherein:
  said siliceous raw material is selected from the group consisting of silica sand, silica, and agalmatolite;
  said high alumina raw material is selected from the group consisting of electrofused alumina, calcined alumina and bauxite and
  said zircon refractory raw material is selected from the group consisting of zirconia and zircon.

6. A refractory gun mix as claimed in claim 1, wherein said hardening accelerator is selected from $Na_2 \cdot SiO_2$, $K_2O \cdot SiO_2$, and $Ca(OH)_2$, the weight of said hardening accelerator is about 0.005–0.5% by weight of the combined weight of said coarse refractory portion and said fine powder portion.

7. A refractory gun mix as claimed in claim 1, wherein said deflocculant is selected from the group consisting of formalin adduct of naphthalenesulfonic acid, lignosulfonate, and sodium phosphate, the weight of said deflocculant is about 0.01 to 0.5% by weight of the combined
  weight of said coarse refractory portion and said fine powder portion.

8. A refractory gun mix as claimed in claim 1, wherein said binder comprises one or more materials selected from the group consisting of a colloidal silica solution and an alumina cement, the combined weight of said colloidal silica solution and said alumina cement is about 0.3–8% by weight of the combined weight of said coarse refractory portion and said fine powder portion.

9. A refractory gun mix as claimed in claim 2 in which the ultrafine powder has a particle size of at most 1 micron in diameter.

10. A refractory gun mix in accordance with claim 8 in which the binder is a colloidal silica solution.

11. A refractory gun mix in accordance with claim 8 in which the binder is an alumina cement.

12. A refractory gun mix according to claim 7 in which the deflocculant is sodium phosphate.

* * * * *